(12) United States Patent
Bian et al.

(10) Patent No.: US 10,670,804 B1
(45) Date of Patent: Jun. 2, 2020

(54) COMPOSITE WAVEGUIDING STRUCTURES INCLUDING SEMICONDUCTOR FINS

(71) Applicant: GLOBALFOUNDRIES Inc., Grand Cayman (KY)

(72) Inventors: Yusheng Bian, Ballston Lake, NY (US); Abu Thomas, Brookline, MA (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/234,906

(22) Filed: Dec. 28, 2018

(51) Int. Cl.
*G02B 6/12* (2006.01)
*G02B 6/122* (2006.01)
*G02B 6/136* (2006.01)

(52) U.S. Cl.
CPC .......... *G02B 6/1223* (2013.01); *G02B 6/136* (2013.01); *G02B 2006/12061* (2013.01); *G02B 2006/12097* (2013.01)

(58) Field of Classification Search
CPC .............. G02B 6/1223; G02B 6/136; G02B 2006/12061; G02B 2006/12097
USPC .......................................................... 385/14
See application file for complete search history.

(56) References Cited

U.S. PATENT DOCUMENTS

| | | | | |
|---|---|---|---|---|
| 8,213,751 B1* | 7/2012 | Ho | ............................ | G02B 6/43 385/1 |
| 9,356,163 B1* | 5/2016 | Liu | .................... | H01L 31/02327 |
| 2011/0007761 A1* | 1/2011 | Assefa | ................ | G02B 6/12004 372/34 |
| 2012/0288228 A1* | 11/2012 | Saito | ....................... | G02B 6/122 385/14 |
| 2013/0136458 A1* | 5/2013 | Kawase | ................. | H04B 10/40 398/135 |
| 2013/0137202 A1* | 5/2013 | Assefa | ................ | G02B 6/12004 438/31 |
| 2016/0197189 A1* | 7/2016 | Cheng | .................. | H01L 29/0847 257/192 |
| 2016/0379747 A1* | 12/2016 | Wolter | ................ | H01F 17/0033 336/200 |
| 2017/0023735 A1* | 1/2017 | Barwicz | ................ | G02B 6/2773 |
| 2017/0131576 A1* | 5/2017 | Gill | ......................... | G02F 1/0147 |
| 2018/0348431 A1* | 12/2018 | Bassett | .............. | G02B 6/12004 |

FOREIGN PATENT DOCUMENTS

WO   WO-2018125226 A1 *  7/2018  ................ H01P 3/12

OTHER PUBLICATIONS

Grote et al., "Single-mode optical waveguides on native high-refractive-index substrates" APL Photonics 1, 071302 (2016).

Vivien et al., "Vertical multiple-slot waveguide ring resonators in silicon nitride" Oct. 27, 2008 / vol. 16, No. 22 / Optics Express 17237.

(Continued)

*Primary Examiner* — Jerry M Blevins
(74) *Attorney, Agent, or Firm* — Thompson Hine LLP; Francois Pagette

(57) ABSTRACT

Waveguiding structures and methods of fabricating a waveguiding structure. The waveguiding structure includes a waveguide and an array of semiconductor fins that are arranged at least in part inside the waveguide.

19 Claims, 5 Drawing Sheets

(56) References Cited

OTHER PUBLICATIONS

Ma et al., "Light propagation in strip and slot waveguide arrays for sensing", Proc. SPIE 10025, Advanced Sensor Systems and Applications VII, 100250U (Nov. 14, 2016).
Balram et al., "Self-aligned silicon fins in metallic slits as a platform for planar wavelength-selective nanoscale resonan photodetectors", Sep. 24, 2012 / vol. 20, No. 20 / Optics Express 22735.
Puckett et al., "Silicon nanoridge array waveguides for nonlinear and sensing applications", Nov. 2, 2015 | vol. 23, No. 22 | Optics Express 28224.

* cited by examiner

COMPOSITE WAVEGUIDING STRUCTURES INCLUDING SEMICONDUCTOR FINS

BACKGROUND

The present invention relates to photonics chips and, more specifically, to waveguiding structures for a and methods of fabricating a waveguiding structure.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

On-chip communication and sensing may rely on transferring optical signals through waveguides on the photonics chip to other optical components. Optical signals propagate as electromagnetic waves within waveguides using a number of different modes characterized by different properties. Waveguides, as well as other optical components, may include cores that are fabricated from silicon nitride or single-crystal silicon. Losses in silicon waveguides tend to be considerably higher than losses in silicon nitride waveguides.

Improved waveguiding structures and methods of fabricating a waveguiding structure are needed.

SUMMARY

In an embodiment of the invention, a hybrid waveguiding structure includes a waveguide, and a plurality of semiconductor fins that are arranged at least in part inside the waveguide.

In an embodiment of the invention, a method is provided for forming a hybrid waveguiding structure. The method includes forming a plurality of semiconductor fins, and forming a waveguide over the plurality of semiconductor fins. The plurality of semiconductor fins are arranged at least in part inside the waveguide.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
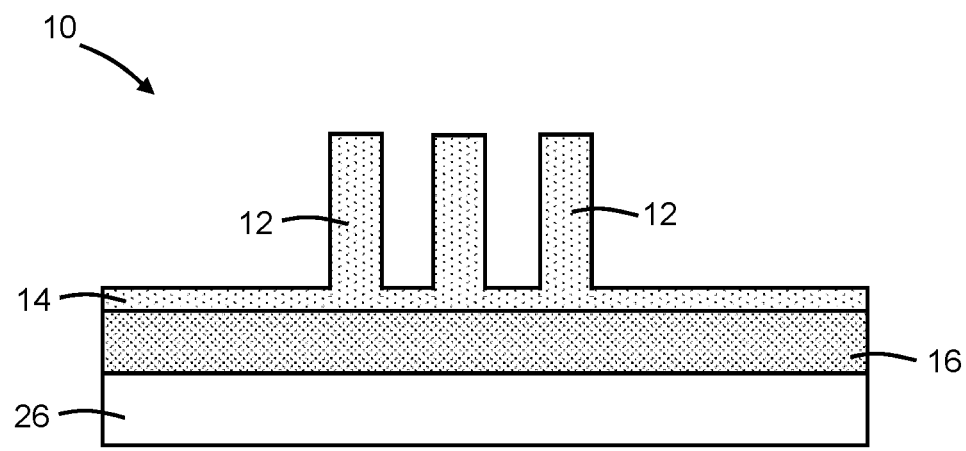
FIG. 1 is a cross-sectional view of structure for waveguide at an initial fabrication stage of a processing method in accordance with embodiments of the invention.

With reference to FIG. 1 and in accordance with embodiments of the invention, a hybrid waveguiding structure 10 includes an array of semiconductor fins 12 that are arranged over a semiconductor layer 14. The semiconductor fins 12 may be formed by patterning the single-crystal semiconductor material (e.g., single-crystal silicon) of the semiconductor layer 14 in a layout associated with the array with lithography and etching processes. The etching process may be timed and halted before the etching process forming the semiconductor fins 12 penetrates fully through the semiconductor layer 14 such that a partial thickness of the semiconductor layer 14 is preserved about the semiconductor fins 12. The semiconductor fins 12 may have vertical sidewalls, as shown, or may have sidewalls that are, for example, tapered. The semiconductor fins 12 may have a parallel or substantially parallel alignment with each other. The number of semiconductor fins 12 in the array may differ from the number in the representative embodiment.

In an embodiment, the semiconductor layer 14 may be composed of the single-crystal semiconductor material, such as single-crystal silicon, and may represent a device layer of a silicon-on-insulator (SOI) wafer that has been etched to form semiconductor fins 12. The silicon-on-insulator (SOI) wafer further includes a buried insulator layer 16 composed of a dielectric material, such as a buried oxide layer composed of silicon dioxide, and a substrate 26 composed of a single-crystal semiconductor material, such as single-crystal silicon. The substrate 26 is separated by the buried insulator layer 16 from the semiconductor layer 14 and semiconductor fins 12.

Figure 2:
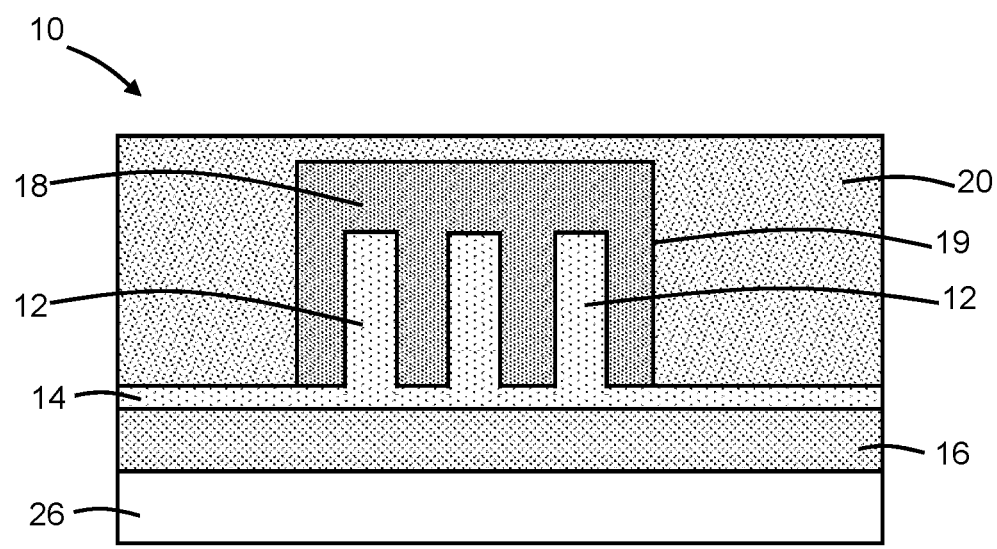
FIG. 2 is a cross-sectional view of the structure at a fabrication stage subsequent to FIG. 1.

With reference to FIG. 2 in which like reference numerals refer to like features in FIG. 1 and at a subsequent fabrication stage, the hybrid waveguiding structure 10 may further include a waveguide 18 that is formed over the semiconductor fins 12, the semiconductor layer 14 between the semiconductor fins 12, and a portion of the semiconductor layer 14 locally surrounding the semiconductor fins 12. The semiconductor fins 12 are embedded or encapsulated inside the waveguide 18 in that the semiconductor fins 12 are spaced inward from the outer surfaces 19 of the waveguide 18 and completely coated or covered by the waveguide 18.

The waveguide 18 may be formed by depositing a non-conformal layer of a dielectric material on the semiconductor fins 12 and the semiconductor layer 14 about and between the semiconductor fins 12, and then patterning the deposited non-conformal layer with lithography and etching processes. To that end, an etch mask is formed over the deposited layer, and the masked deposited layer is etched with an etching process, such as reactive ion etching (RIE) or a wet chemical etching process. The waveguide 18 has a thickness that is greater than the height of the semiconductor fins 12 and, following patterning, surrounds and encapsulates the semiconductor fins 12. For example, the waveguide 18 may be composed of silicon nitride that that is etched using a wet chemical solution containing hydrofluoric acid. The etching process may remove the dielectric material of the waveguide 18 selective to the semiconductor material of the semiconductor layer 14. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process.

In embodiments, the waveguide 18 may be formed from a mid-index to high-index dielectric material having a refractive index in a range from about 1.9 to about 2.5. In embodiments, the waveguide 18 may be composed of silicon nitride, zinc oxide, titanium dioxide, zirconium dioxide, or a combination of these dielectric materials. For example, at a wavelength of 1310 nanometers, the refractive index of silicon is about 3.5, the refractive index of silicon nitride is about 2.0, the refractive index of zinc oxide is about 1.9, the refractive index of titanium dioxide is about 2.5, and the refractive index of zirconium dioxide is about 2.1. Some dielectric materials, such as aluminum oxide and silicon dioxide, as well as water, may not be suitable for forming the waveguide 18 because of an overly-large difference in refractive index in comparison with silicon. For example, such materials may have a refractive index that is less than 1.9, such as aluminum oxide having a refractive index of about 1.75, silicon dioxide having a refractive index of about 1.45, and water having a refractive index of about 1.33.

As used herein, the semiconductor fins 12 and waveguide 18 collectively represent a composite or hybrid waveguiding structure in which propagating optical signals are confined. A cladding layer 20 is formed that covers the exterior of the waveguide 18. Portions of the dielectric material of the waveguide 18 are arranged between all surfaces of the semiconductor fins 12 and the cladding layer 20. In an embodiment, the cladding layer 20 may be composed of silicon dioxide. The buried insulator layer 16 provides a lower cladding layer for the hybrid waveguiding structure.

The propagation loss of the waveguide 18 may be reduced by the introduction of the semiconductor fins 12 due to a reduced coupling to radiation modes, while still maintaining a reasonable optical confinement owing to semiconductor fins 12 in the high-index contrast fin structure. In an embodiment, the number of semiconductor fins 12 in the array may be greater than or equal to three (3) to provide an optical confinement improvement in comparison with a waveguide 18 that lacks the semiconductor fins 12.

In alternative embodiments, the hybrid waveguiding structure may also be CMOS compatible, as subsequently described. For example, the hybrid waveguiding structure may be used to route optical signals on a photonics chip formed using the SOI wafer.

Figure 3:
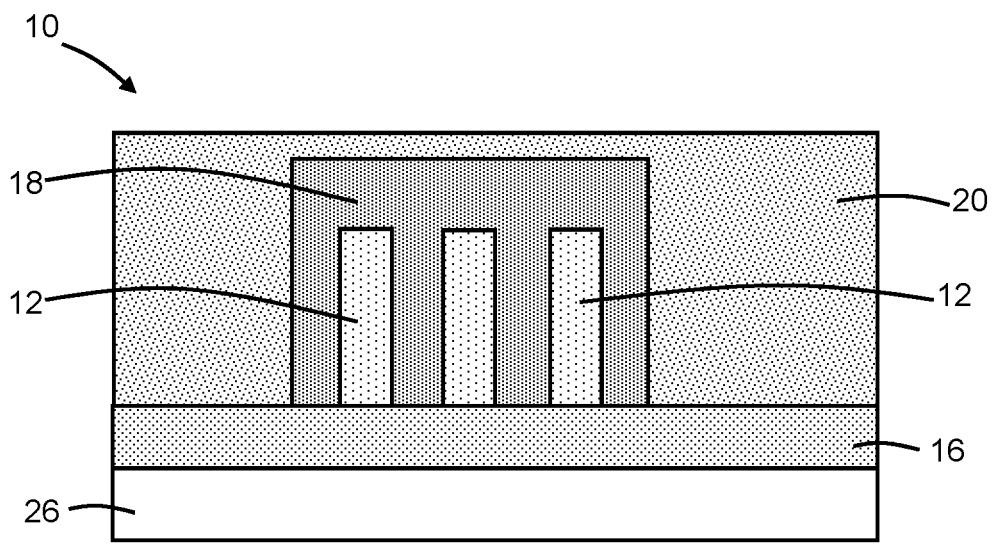
FIGS. 3-9 are cross-sectional views of structures in accordance with alternative embodiments of the invention.

With reference to FIG. 3 and in accordance with embodiments of the invention, the etching process forming the semiconductor fins 12 may penetrate fully through the semiconductor layer 14 such that the surface area of the buried insulator layer 16 is exposed about the semiconductor fins 12. The etching process may remove the semiconductor material of the semiconductor layer 14 selective to the dielectric material of the buried insulator layer 16 and stop on the buried insulator layer 16. The formation of the waveguide 18 and the cladding layer 20 process as previously described. The waveguide 18 and the cladding layer may directly contact the buried insulator layer 16, which is exposed by the etching process.

Figure 4:
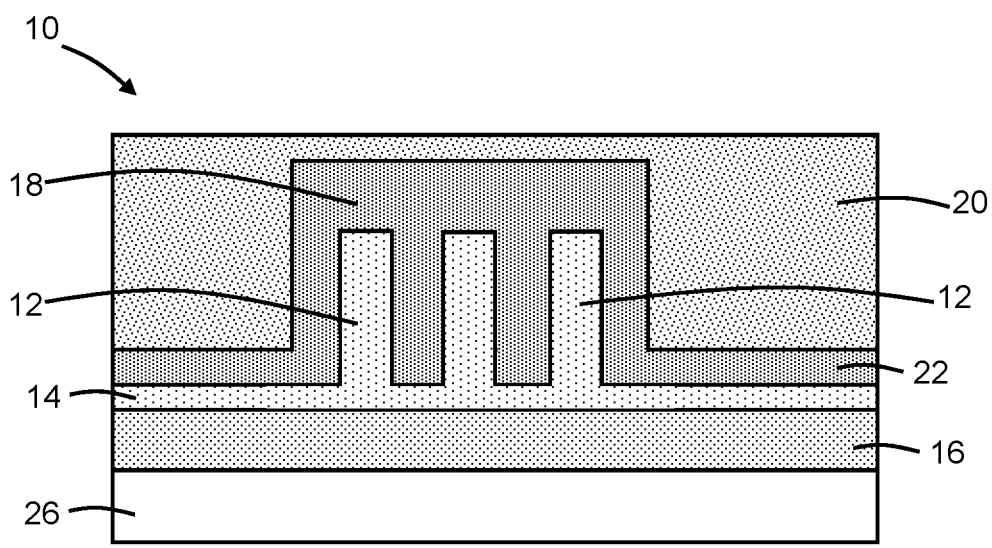

With reference to FIG. 4 and in accordance with embodiments of the invention, the etching process forming the waveguide 18 may penetrate only partially through the deposited dielectric layer such that the buried insulator layer 16 about the semiconductor fins 12 is covered by a layer 22 of the same dielectric material as the waveguide 18. The cladding layer 20 is then formed, as previously described, to cover this ridge version of the waveguide 18.

Figure 5:
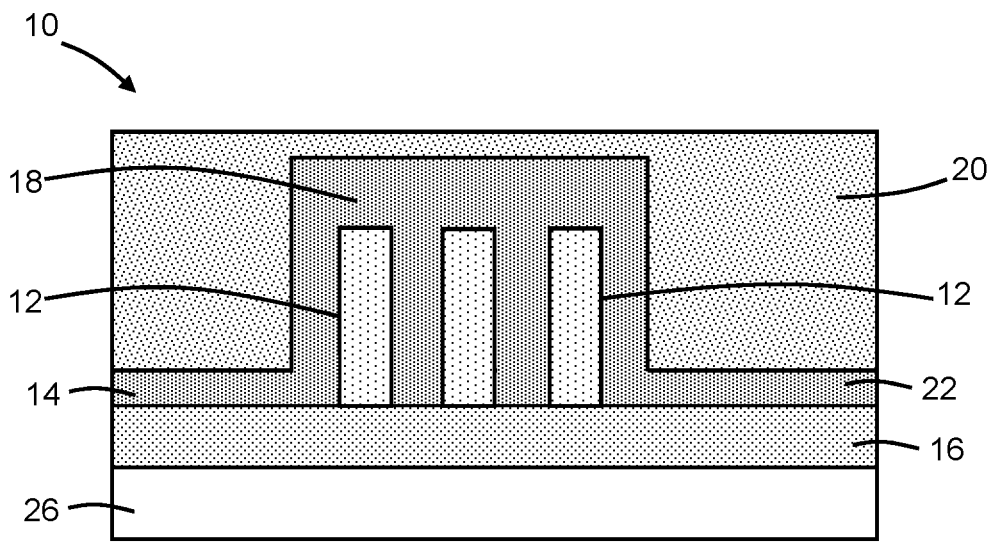

With reference to FIG. 5 and in accordance with embodiments of the invention, the semiconductor fins 12 may be formed by etching fully through the semiconductor layer 14, as described in connection with FIG. 1, and the layer 22 may be formed that extends from the base of the waveguide 18, as described in connection with FIG. 4.

Figure 6:
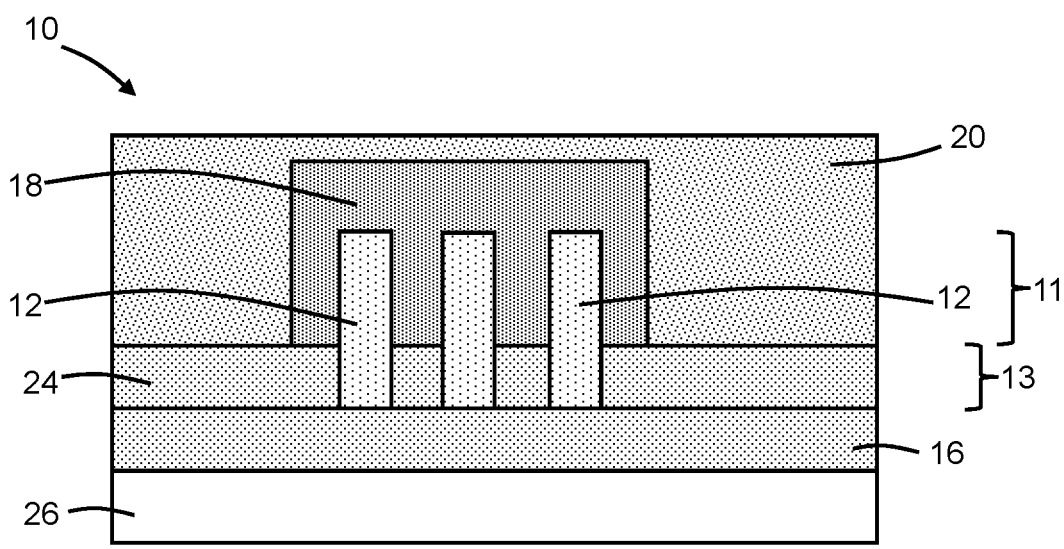

With reference to FIG. 6 and in accordance with embodiments of the invention, a trench isolation region 24 may formed on the buried insulator layer 16 following the formation of the semiconductor fins 12 by fully etching the semiconductor layer 14 (FIG. 1). The trench isolation region 24 may be formed by depositing a layer composed of a dielectric material, such as an oxide of silicon (e.g., silicon dioxide), by chemical vapor deposition (CVD), and recessing the deposited dielectric layer with an etching process. An upper section 11 of each of the semiconductor fins 12 is revealed by the recessing of the trench isolation region 24, and a lower section 13 of each of the semiconductor fins 12 is surrounded by the trench isolation region 24. Processing continues to form the waveguide 18 and cladding layer 20, which each may directly contact the trench isolation region 24. In an alternative embodiment, the dielectric layer used to form the waveguide 18 may be partially etched, as described in connect with FIG. 4, to provide the layer 22, which may be in direct contact with the trench isolation region 24 surrounding the waveguide 18 and arranged between the cladding layer 20 and the trench isolation region 24.

Figure 7:
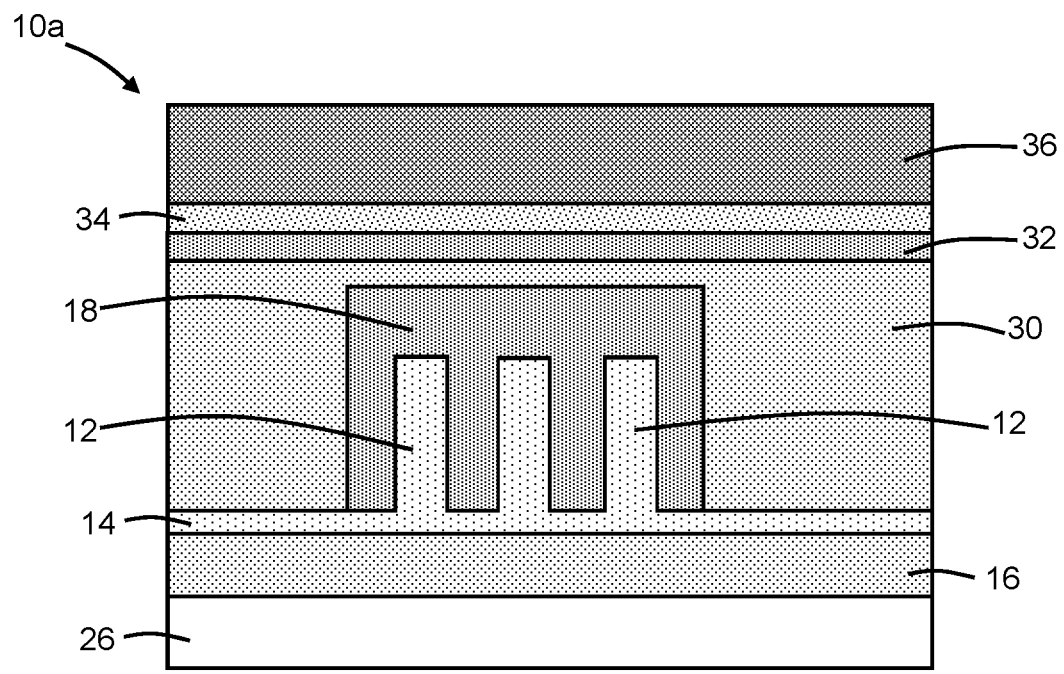

With reference to FIG. 7 and in accordance with embodiments of the invention, a hybrid waveguiding structure 10a includes a dielectric layer 30 that may be formed over the waveguide 18 and layer 22. The dielectric layer 30 is arranged to surround the waveguide 18 and has a top surface that is arranged above a top surface of the waveguide 18 such that the waveguide 18 is encapsulated by the dielectric layer 30. The dielectric layer 30 may be composed of a dielectric material, such as silicon dioxide, deposited by chemical vapor deposition. The dielectric layer 30 may be formed by depositing a layer of its constituent dielectric material and planarizing the deposited layer with, for example, chemical mechanical polishing (CMP). For example, the dielectric layer 30 may be composed of an oxide of silicon, such as silicon dioxide, deposited by chemical vapor deposition using ozone and tetraethylorthosilicate (TEOS) as reactants. Portions of the dielectric material of the waveguide 18 are arranged between all surfaces of the semiconductor fins 12 and the dielectric layer 30.

A dielectric layer 32 is formed over the dielectric layer 30. The dielectric layer 32 may be composed of a dielectric material, such as silicon nitride, deposited by atomic layer deposition or chemical vapor deposition. In an embodiment, the dielectric layer 32 may be composed of the same dielectric material as the waveguide 18. In an embodiment, the dielectric layer 32 and the waveguide 18 may each be composed of silicon nitride. The dielectric layer 32, which is formed on a planar top surface of the dielectric layer 30, may be planar with a uniform thickness. In an embodiment, the dielectric layer 32 may be composed of silicon nitride deposited by plasma-enhanced chemical vapor deposition (PECVD). The dielectric 32 may find use in other regions of the SOI wafer containing standard logic devices as a silicide-blocking layer in a so-called OP process.

A dielectric layer 34 is formed over the dielectric layer 32. In an embodiment, the dielectric layer 34 is composed of an undoped oxide of silicon (e.g., undoped silicon dioxide) deposited by chemical vapor deposition or atomic layer deposition. The dielectric layer 34, which is formed on a planar top surface of the dielectric layer 32, may be planar with a uniform thickness.

A multilayer back-end-of-line stack, generally indicated by reference numeral 36, is formed by back-end-of-line (BEOL) processing over the dielectric layer 34. The back-end-of-line stack 36 may include one or more interlayer dielectric layers composed of dielectric materials, such as a carbon-doped silicon oxide, and metallization composed of, for example, copper, tungsten and/or cobalt that is arranged in the one or more interlayer dielectric layers.

In alternative embodiments, the semiconductor layer 14 may be fully etched such that the dielectric layer 30 may directly contact the buried insulator layer 16 and/or the dielectric material of the waveguide 18 may be partially etched such that the layer 22 is present and may be directly contacted by the dielectric layer 30. In alternative embodiments, the trench isolation region 24 may be formed such that the dielectric layer 30 may directly contact the trench isolation region 24 and, optionally, the dielectric material of the waveguide 18 may be partially etched such that the layer 22 is present over the trench isolation region 24 and may be directly contacted by the dielectric layer 30.

The hybrid waveguiding structure 10a may be integrated into a photonics chip that includes electronic components and additional optical components. For example, the electronic components may include field-effect transistors that are fabricated by CMOS front-end-of-line (FEOL) processing using the semiconductor material of the device layer of the SOI wafer. In particular, the field-effect transistors may be fin-type field-effect transistors that are fabricated using semiconductor fins that are similar to semiconductor fins 12.

Figure 8:
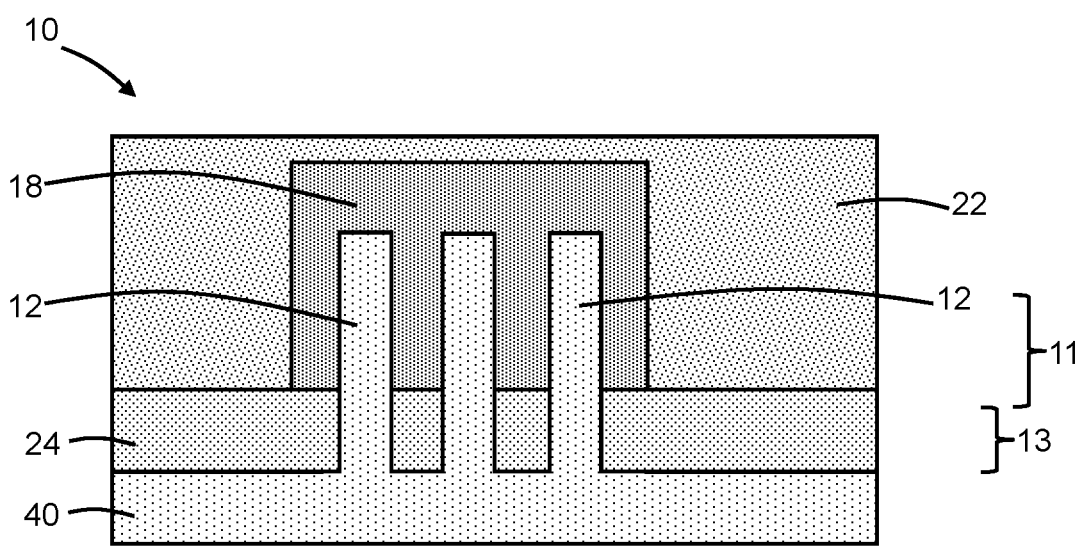

With reference to FIG. 8 and in accordance with embodiments of the invention, the semiconductor fins 12 may be formed using a bulk semiconductor substrate 40, instead of an SOI wafer. In an embodiment, the bulk semiconductor substrate 40 may contain a single-crystal semiconductor material, such as single-crystal silicon. The trench isolation region 24 is formed, as described previously, followed by the formation of the waveguide 18 and cladding layer 20. In an alternative embodiment, the waveguide 18 may include the layer 22 that is arranged over the trench isolation region 24 and between the cladding layer 20 and the trench isolation region 24. In an alternative embodiment, the dielectric layers 30, 32, 34 and the back-end-of-line stack 36 may formed over the waveguide 18, which may optionally include the layer 22.

Figure 9:
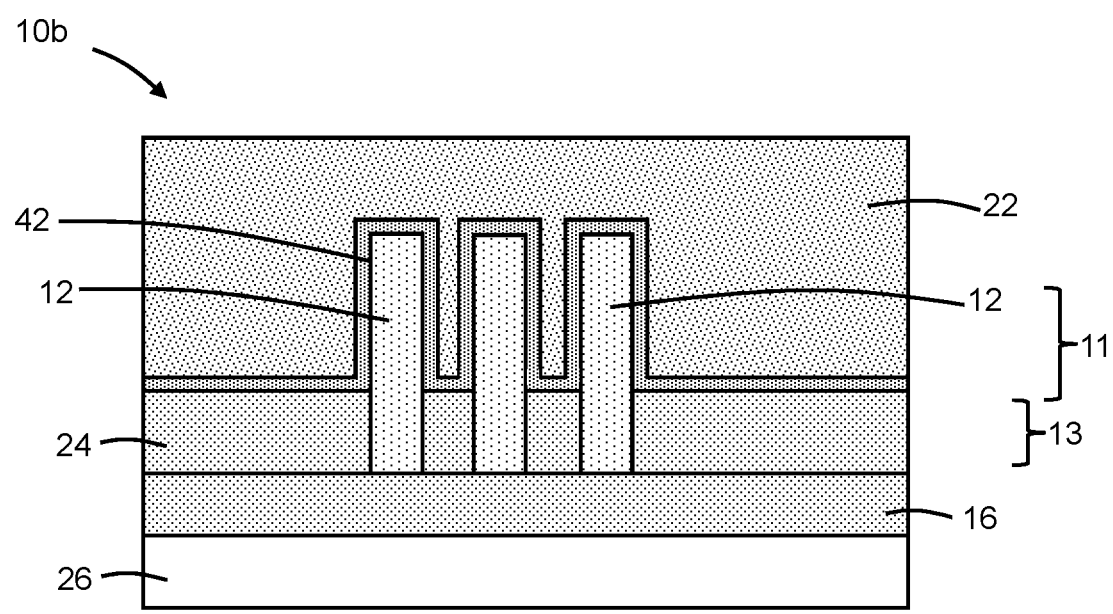

With reference to FIG. 9 and in accordance with embodiments of the invention, the waveguide 18 may be replaced by a conformal layer 42 that is formed over the upper sections 11 of the semiconductor fins 12 and the trench isolation region 24. The conformal layer 42 has a thickness that is substantially uniform or constant at any location. A hybrid waveguiding structure 10b includes the conformal layer 42, which may be composed of silicon nitride or another mid-index to high-index dielectric material, and the semiconductor fins 12 that are clad by the conformal layer 42. In an alternative embodiment, the dielectric layers 30, 32, 34 and the back-end-of-line stack 36 may formed over the hybrid waveguiding structure 10b that includes the conformal layer 42 and the semiconductor fins 12.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hybrid waveguiding structure comprising:
a waveguide comprised of a dielectric material; and
a plurality of semiconductor fins that are surrounded and encapsulated at least in part inside the waveguide,
wherein the waveguide has a thickness that is greater than a height of the plurality of semiconductor fins, the waveguide includes a plurality of outer surfaces, and the plurality of semiconductor fins are spaced inward from the plurality of outer surfaces of the waveguide.

2. The hybrid waveguiding structure of claim 1 wherein the dielectric material is silicon nitride, and the plurality of semiconductor fins are comprised of single-crystal silicon.

3. The hybrid waveguiding structure of claim 1 wherein the dielectric material has a refractive index in a range from about 1.9 to about 2.5.

4. The hybrid waveguiding structure of claim 1 wherein the dielectric material is silicon nitride, zinc oxide, titanium dioxide, or zirconium dioxide.

5. The hybrid waveguiding structure of claim 1 wherein the plurality of semiconductor fins are arranged over a buried insulator layer of a semiconductor-on-insulator wafer.

6. The hybrid waveguiding structure of claim 5 wherein the waveguide is arranged over the buried insulator layer, and a section of a device layer of the semiconductor-on-insulator wafer is arranged about the waveguide and between the waveguide and the buried insulator layer.

7. The hybrid waveguiding structure of claim 5 wherein the waveguide has a directly contacting relationship with the buried insulator layer.

8. The hybrid waveguiding structure of claim 5 wherein each semiconductor fin includes an upper section and a lower section, and further comprising:
 a trench isolation region surrounding the lower section of each semiconductor fin,
 wherein the upper section of each semiconductor fin is arranged inside the waveguide, and the trench isolation region is arranged between the buried insulator layer and the waveguide.

9. The hybrid waveguiding structure of claim 1 wherein the plurality of semiconductor fins are arranged over a bulk substrate.

10. The hybrid waveguiding structure of claim 9 wherein each semiconductor fin includes an upper section and a lower section, and further comprising:
 a trench isolation region over the bulk substrate and surrounding the lower section of each semiconductor fin,
 wherein the upper section of each semiconductor fin is arranged inside the waveguide.

11. The hybrid waveguiding structure of claim 1 wherein the plurality of semiconductor fins are aligned with a substantially parallel arrangement.

12. The hybrid waveguiding structure of claim 1 further comprising:
 a dielectric layer arranged over the waveguide, the dielectric layer comprised of silicon nitride; and
 a back-end-of-line stack arranged over the dielectric layer.

13. The hybrid waveguiding structure of claim 1 wherein the plurality of semiconductor fins comprise three or more semiconductor fins.

14. The hybrid waveguiding structure of claim 1 wherein the dielectric material of the waveguide is located in respective spaces between the plurality of semiconductor fins.

15. A method of forming a hybrid waveguiding structure, the method comprising:
 forming a plurality of semiconductor fins;
 depositing a non-conformal dielectric layer over the plurality of semiconductor fins; and
 patterning the non-conformal dielectric layer to form a waveguide,
 wherein the plurality of semiconductor fins are surrounded and encapsulated at least in part inside the waveguide, and the waveguide has a thickness that is greater than a height of the plurality of semiconductor fins.

16. The method of claim 15 wherein forming the plurality of semiconductor fins comprises:
 patterning a device layer of a silicon-on-insulator wafer to form the plurality of semiconductor fins.

17. The method of claim 16 wherein the device layer is patterned by an etching process that stops on a buried insulator layer of the silicon-on-insulator wafer.

18. The method of claim 15 wherein forming the plurality of semiconductor fins comprises:
 patterning a bulk semiconductor substrate to form the plurality of semiconductor fins.

19. The method of claim 18 further comprising:
 depositing a dielectric layer over the plurality of semiconductor fins; and
 recessing the dielectric layer relative to the plurality of semiconductor fins to form a trench isolation region that reveals respective upper sections of the plurality of semiconductor fins.

* * * * *